United States Patent [19]
Smith et al.

[11] Patent Number: 4,942,589
[45] Date of Patent: Jul. 17, 1990

[54] CHANNELIZED BINARY-LEVEL HOP RATE DETECTOR

[75] Inventors: Patrick J. Smith; Ronald S. Leahy, both of Salt Lake City, Utah; Scott R. Bullock, Cos, Colo.

[73] Assignee: Unisys Corporation, Blue Bell, Pa.

[21] Appl. No.: 417,175

[22] Filed: Oct. 4, 1989

[51] Int. Cl.$^5$ ............................................. H04K 1/00
[52] U.S. Cl. ...................................................... 375/1
[58] Field of Search ............................. 375/1; 380/34

[56] References Cited
U.S. PATENT DOCUMENTS

| | | | |
|---|---|---|---|
| 4,361,891 | 11/1982 | Lobenstein et al. | 375/1 |
| 4,611,333 | 9/1986 | McCallister et al. | 375/1 |
| 4,621,365 | 11/1986 | Chio | 375/1 |
| 4,638,493 | 1/1987 | Bishop et al. | 375/1 |
| 4,761,795 | 8/1988 | Beier | 375/1 |
| 4,841,544 | 6/1989 | Nuytkens | 375/1 |
| 4,905,221 | 2/1990 | Ichiyoshi | 375/1 |
| 4,914,674 | 4/1990 | Kimber et al. | 375/1 |

*Primary Examiner*—Salvatore Cangialosi
*Attorney, Agent, or Firm*—Alfred W. Kozak; Robert S. Bramson

[57] ABSTRACT

A hop rate detector, for receiving frequency-hopped signals carrying information data, which generates a tone at the "hop rate" when modulated or unmodulated frequency-hopped signals are present. The input signal is channelized into sub-bands via filter banks and the signal in each channel is power detected (squared) and compared to a present threshold to produce a positive voltage (="1") if the threshold is exceeded and zero volts (="0") otherwise. The channel signals are split into an upper band ($B_u$) and lower band ($B_d$), then each band is summed and the lower band sum subtracted from the upper band sum to provide a first stage signal. The first stage signal has its DC component removed, then is multiplied by a delayed copy of itself to provide a frequency tone indicating the hop rate of the received signal.

12 Claims, 9 Drawing Sheets

CHANNELIZED BINARY-LEVEL HOP RATE DETECTOR

FIELD OF THE INVENTION:

This disclosure involves the class of frequency hopped signal detectors which combine feature detection techniques with channelizing techniques, and specifically relates to hybrid detectors providing information related to the hop rate while being insensitive to unrelated signal sources.

BACKGROUND OF THE INVENTION

In order to develop secure and reliable digital communication systems, frequency hop nets have been developed. These systems pseudo randomly change their operating band or channel, making unauthorized reception very difficult. Frequency hop nets are able to maintain intelligible communications with as much as 20% of their channels jammed, and for this reason, covert frequency hop (FH) nets usually operate in cluttered spectral regions. In addition, the hop rates are generally fairly low (about 50-500 Hz). Thus, radio stations and other potential interference sources with bandwidths greater than 500 Hz will considerably reduce the sensitivity of fourth law type detectors. Fourth law detectors are detectors whose output signal/noise ratio ($SNR_o$) is proportional to the fourth power of the input signal/noise ratio ($SNR_i$); thus $SNR_o = K(SNR_i)^4$, with K being a constant.

Because of this limitation, practical frequency hopping (FH) detection schemes have often utilized channelizers which allow the operator to keep track of narrowband interference sources. These methods rely on the high instantaneous signal-to-noise ratio in the occupied channel for detection. However, channelizers suffer from a lack of efficient automatic detection algorithms. Thus, it would be useful to develop a hybrid detector which would include both channelizing and automatic feature detection circuitry and yet would still retain the advantages of both of these systems.

Frequency hop radios create processing gain by utilizing a large number of independent hop locations. For example, the Jaguar (manufactured by Racal-Tacticom, Ltd.) radio makes use of approximately 256 (minimum, - may use up to 2000) different hop locations. It may be seen that the input bandwidth, W, of a frequency hop detector is much larger than the width of the binary phase shift keyed enVelope (BPSK), B. "B" is the bandwidth of the BPSK envelope and B is assumed to be less than W.

Therefore, the BPSK modulation can be collapsed and the noise decorrelated by a "delay-and-complex conjugate multiply stage" in which the delay is set to approximately 1/W. This method is utilized by the type of hop rate detector known as the MODAC hop rate detector, FIG. 2B. The MODAC detector is manufactured by Pacific Sierra Research, Los Angeles, CA.

The output signal of the MODAC hop rate detector is seen to be a random complex phase shift keying signal (PSK) with transitions occurring at the hop rate, $1/T_h$. In this situation, the PSK signal-to-noise ratio is significantly improved by low pass filtering near the hop rate, and a spectral line (at the hop rate) is generated by another delay-and-complex conjugate multiply stage in which the delay is set to approximately $T_h/2$.

In the AC hop rate detector, shown in FIG. 2A, and in the AC radiometer shown in FIG. 3A, the input band is divided into two "half bands", and the BPSK modulation is collapsed by magnitude squaring. The outputs of the squaring devices are then subtracted to form a bipolar signal. The difference amplifier is AC coupled (eliminating the DC) to the second stage of the detector because of the direct current (DC) component which is generated by the magnitude squaring of the noise.

The input signal hops randomly between the two half bands, and thus the first stage output signal is a random direct sequence (DS) waveform with transitions occurring at the hop rate. As with the MODAC detector, the DS signal-to-noise ratio is significantly improved by lowpass filtering near the hop rate.

The AC radiometer (FIG. 3A) collapses the direct sequence (DS) signal by squaring, and then utilizes an integrator or a lowpass filter for detection. The AC hop rate detector (of FIG. 2A) generates a spectral line at the hop rate with a delay-and-mix circuit, with the delay set to approximately $T_h/2$, as with the MODAC detector.

Up until the first lowpass filter, the AC hop rate detector and the AC radiometer are identical. However, the AC hop rate detector delay-and-mix circuit (FIG. 2A) generates a square wave with one-half the input signal amplitude, and thus one-fourth the signal power. The power in the fundamental of the square wave is further reduced by a factor of $4/\pi^2$.

It follows that the AC radiometer (FIG. 3) output signal-to-noise ratio is approximately 9 dB greater than that of the AC hop rate detector (FIG. 2A).

Additionally, analysis has been made to indicate that, for low input signal-to-noise ratios, the AC hop rate detector (FIG. 2A) outperforms the MODAC hop rate detector (FIG. 2B) by 3 dB.

Spectral analysis techniques, it may be understood, will not always reveal the presence of hybrid FH/DS (frequency hopping/direct sequence) signals because of the inherent covert nature of these signals. However, the class of fourth law detectors described heretofore has been shown to be useful against all types of frequency hopped signals.

For example, the AC radiometer (FIG. 3) generates a DC level when FH signals are "present", thus reducing the signal present/signal absent decision to a comparison with a set threshold. In addition to "signal presence", the "hop rate" can be determined with both the AC hop rate detector (FIG. 2A), and the MODAC hop rate detector (FIG. 2B). Each of these detectors generates a spectral line at the hop rate, which can be detected and characterized by ordinary spectral analysis techniques.

Another class of detectors which has been shown to be useful against frequency hopped signals utilizes channelizing techniques. At any given point in time, the hybrid FH/DS signal is present in one channel only, thus providing a much higher instantaneous signal-to-noise ratio, which can be exploited by various methods.

Thus, it is an object of the present invention to provide for a hybrid channelizing/fourth law frequency hopped signal detector which has near optimal performance in most practical situations.

From FIG. 2A, it is clear that the AC hop rate detector lends itself to channelization, since the input signal is first divided into two separate frequency bands. In particular, the input signal of bandwidth W may be divided into L contiguous bands by a bandpass filter bank (FIG. 3B). Each bandpass filter is followed by a "magnitude squaring" vice, which produces a voltage level which is, ʌ ʹιe average, the power of the signal and noise preseı.. ı that frequency band. It is assumed that the filter passbands are large enough that the input signal will usually be contained in a single band, or channel, in which case the output signal will be the same as for the AC hop rate detector. In addition, analysis has shown that the spectral density of the output noise near DC is the same as for the AC hop rate detector, and hence the output signal-to-noise ratio will also be the same. Thus, if L is a large number, then the channels containing narrowband interference can be switched off without significantly affecting the output signal-to-noise ratio in the absence of that interference. Hence it can be seen that the hybrid detector shown in FIG. 11 combines many of the advantages of channelization with the advantages inherent in the AC hop rate detector. However, this hybrid detector design suffers from the drawback that it requires the constant attention of the operator.

SUMMARY OF THE INVENTION

The present invention provides for frequency hopped signal reception using a hybrid detector which includes the virtues of channelizing circuitry and automatic feature detection circuitry in order to retain the advantages of both. In addition, a non-linear operation is included which provides immunity against unrelated narrowband (NB) interference. In the present configuration, the input signal of bandwidth W is now divided into L contiguous bands by a bandpass filter bank (FIG. 1) and each filter is followed by a "magnitude squaring" device. The voltage levels of the squaring devices are compared with a preset threshold, returning a "1" if the threshold is exceeded, and "0" otherwise. In effect, the comparator decides whether or not a signal is "present" in that channel. These on/off levels are then summed or subtracted, depending on which half of the input band the particular filter passband lies in. Input signals and associated noise are filtered into a series of bands by bandpass filters. There is an upper series of bands and a lower series of bands whereby the outputs of the upper series of bands are magnitude squared, quantized into a binary level, summed by a summation circuit and fed into the positive input of a differential amplifier. Concurrently, the series of lower bands are magnitude squared, quantized into a binary level, summed, and then fed into the negative input of the differential amplifier for subtractive purposes.

The output of the differential amplifier is a direct sequence (DS) signal with transitions occurring at the hop rate, i.e., the rate at which the operating frequency of the information signal is pseudo randomly hopped. The delay-and-mix circuit then generates a tone at the hop rate when either modulated or unmodulated frequency hopped signals are present in the input band.

Because the comparators limit the power from any one channel, then, assuming that L is large, a narrowband interferer will have a negligible effect on the detector performance. Hence, this binary-level hybrid detector has considerable immunity to the narrowband interference sources about which covert FH nets often operate.

For large values of L, the instantaneous signal-to-noise ratio in the occupied channel is relatively high. It thus was found that detector sensitivity could be improved by following each squaring device with a "non-linearity" that takes advantage of these high instantaneous power levels. This non-linearity is referenced herein as g( ), which denotes a general nonlinear function such as that g(x) is a function of x, as indicated in FIG. 4.

By virtue of mathematical formulation and expression of an approximate solution, it could be shown that a close to optimal non-linearity exists which significantly reduces the sensitivity of the hybrid detector to narrowband interference. The approximation is the binary level threshold and this is easily implemented. Thus an operator of such a system would be free of tracking narrowband interference sources and the detector could be considered to operate fully automatically.

DESCRIPTION OF PREFERRED EMBODIMENT

Figure 1:
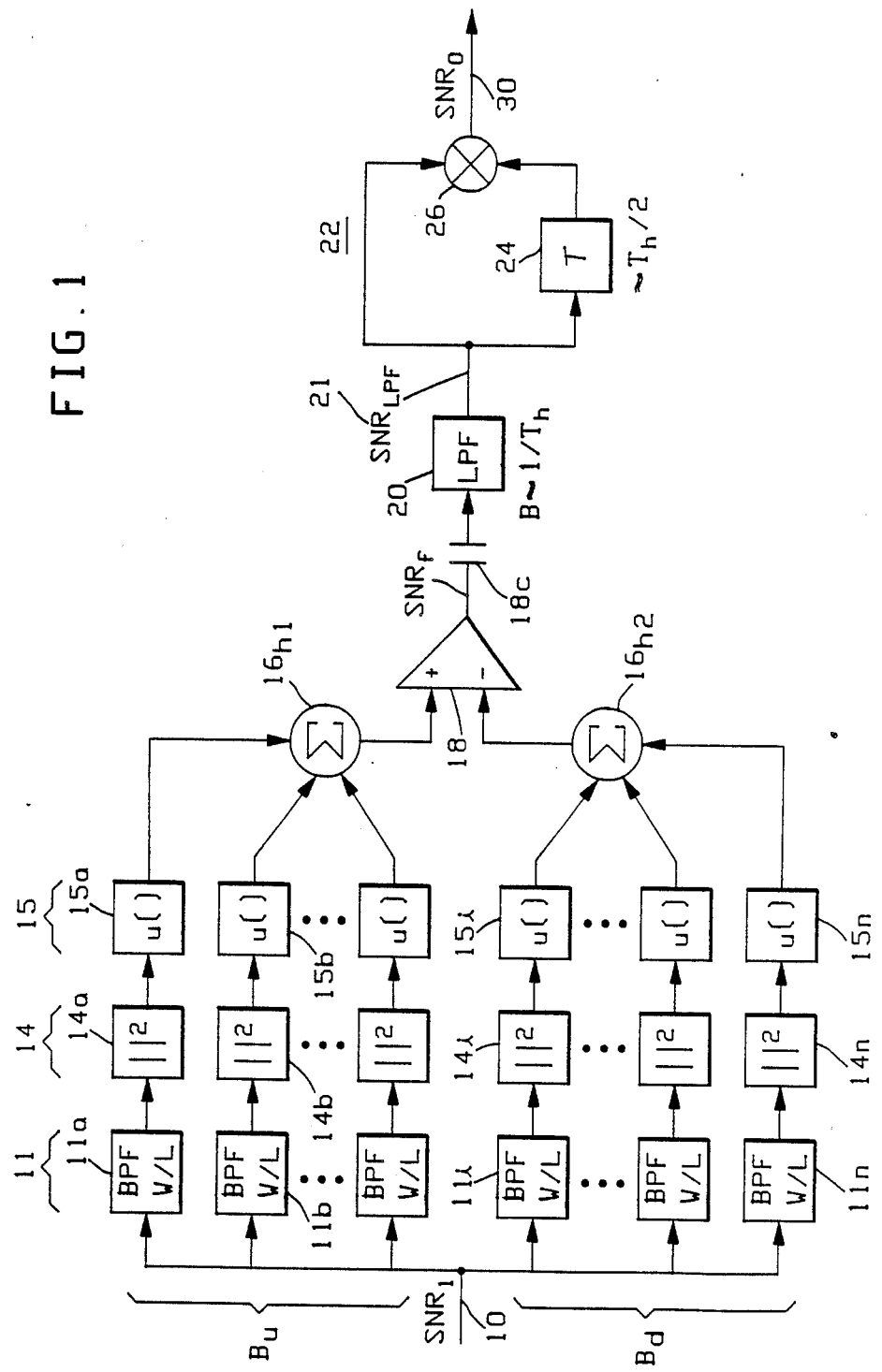
FIG. 1 is a diagram of the channelized binary-level hop rate detector disclosed in this invention.

Referring to FIG. 1, there is seen the hybrid channelized binary-level hop rate detector. The entire incoming bandwidth W is subdivided into L separate individual sub-bandwidths. These sub-bandwidths are then grouped into an upper bandwidth $B_u$ and a lower bandwidth $B_d$. The channelization system thus operates on a signal so as to divide the signal into multiple signals according to spectral content.

The incoming signal line 10 is connected to each set of bandpass filters $11_a \ldots 11_i \ldots 11_n$, each one of which has its own bandpass filter to cover a particular area of the bandwidth. The output of each individual bandpass filter is fed to an individual set of squaring circuits 14 which are designated as $14_a \ldots 14_n$.

In FIG. 1, a group of quantizers 15 is shown where there is provided an individual quantizer for each bandpass channel. These are designated as $15_a \ldots 15_i \ldots 15_n$. The output of each squaring circuit 14 is single-bit quantized by comparison with a "threshold level". This method operates since the instantaneous signal-to-noise ratio in an "occupied" channel is much higher than the overall signal-to-noise ratio. The probability of crossing the threshold while the FH signal is "present" --- is much higher than for the "noise only" case and thus, with $L_{th}$ properly set ($L_{th}$ is the threshold level that depends on the input signal-to-noise ratio), the detector sensitivity can be improved.

Though amplitude information is lost by single-bit quantization, it may be understood that, while the signal is present in a particular channel, the signal at the output of the squaring device unit 14 is a DC level where $A^2$ is the power level of the FH (frequency hopped) signal. It can thus be seen that information relating to the presence of "signal" is preserved by single-bit quantization of the channel.

On the other hand, the quantizers 15 also limit the amount of power in any one channel, and thus limit the effect of high power narrowband signals when present in one or more channels. These high power narrowband signals may be present, sometimes, as a result of "jamming" noise interference.

The term "false alarm" is used to denote the crossing of a threshold value "$L_{th}$" when no-signal is present in the channel. The optimal probability of a "false alarm" is designated as $p_{opt}$.

The "detection probability "q" is the probability that the threshold value $L_{th}$ will be crossed when a signal is present in the channel.

Figure 7:
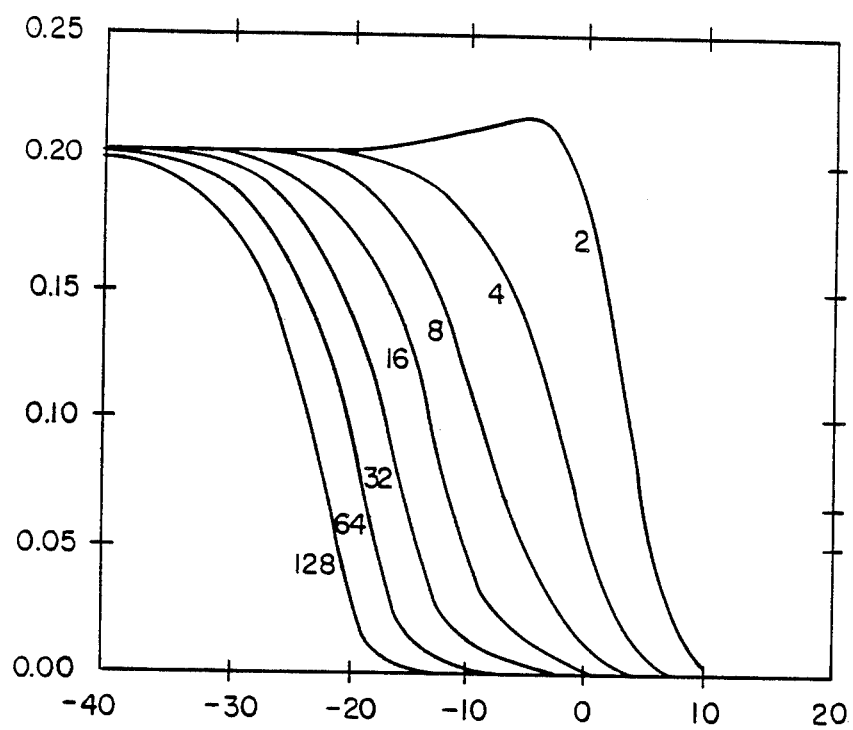
FIG. 7 is a graph of optimal probability of false alarm as a function of input signal-noise ratio.

The "first stage" signal-noise ratio, $SNR_f$ can be written:

$$SNR_f = \frac{(q-p)^2}{(L-1)(p-p^2) + (q-q^2)} \quad \text{[Eq. I]}$$

where p is probability of false alarm; and q is probability of detection;

This equation for $SNR_f$ can be mathematically optimized, and by using various numerical techniques and graphically plotted charts, the optimal probability of false alarm, $p_{opt}$, as a function of input signal-noise ratio, $SNR_i$, for different values of L, is shown in FIG. 7.

Thus given the optimal probability of a false alarm, $p_{opt}$, as a function of the input signal-noise ratio, $SNR_i$, then the "detection probability", q, can be calculated to $$q = Q\left(\frac{|A|}{\sigma L}, \sqrt{-2 \log p}\right) \quad \text{[Eq. II]}$$

where A = signal at output of squaring device, and

[Marcum Q function]  [Eq. III]

$$Q = Q(x,y) = \int_y^{+\infty} re^{-(x^2+r^2)/2} \cdot I_o(xr)dr$$

where $I_o$ = Modified Bessel function of first kind - order o;
x = First variable of Marcum-Q function;
y = Second variable of Marcum-Q function;
r = Dummy variable for integration;
e = Mathematical-transcendental number value;
dr = Differential of r.

This type of Marcum Q function is discussed in *IEEE Transactions on Information Theory*, Vol. IT-26, No. 1 January 1980, pages 121–124.

Figure 8:
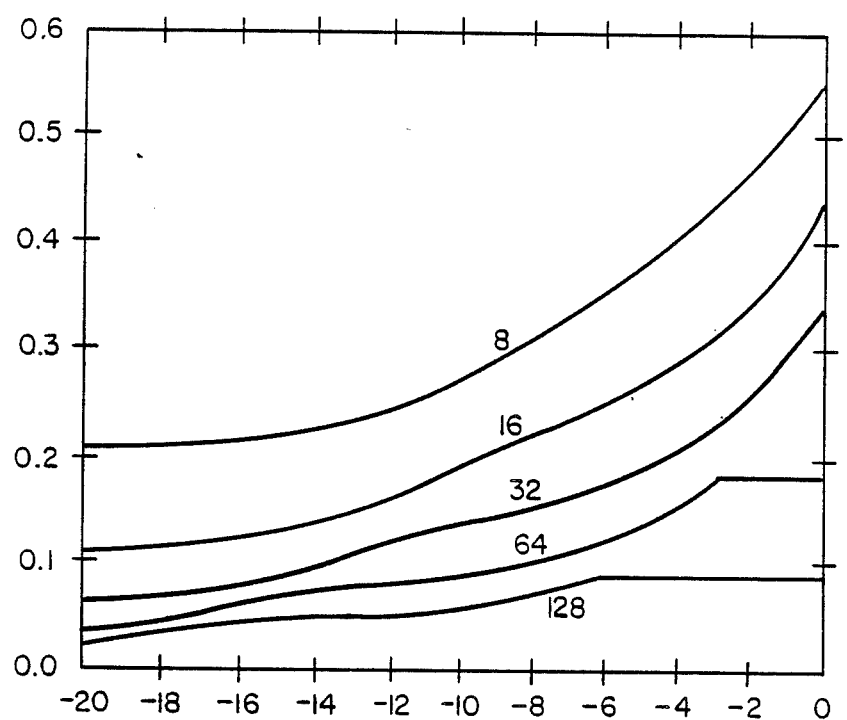
FIG. 8 shows the relation of optimal threshold level to input signal-noise ratio.

The optimal threshold level, $L_{th}$, (Equation IV) is shown plotted in FIG. 8 for different values of L, in relationship to the $SNR_i$.

$$L_{th} = -2\pi L^2 \cdot \log p_{opt}$$

where $L_{th}$ is the channel threshold optimal level, and is the variance of the bandpass Gaussian noise present in the channel.

Figure 5:
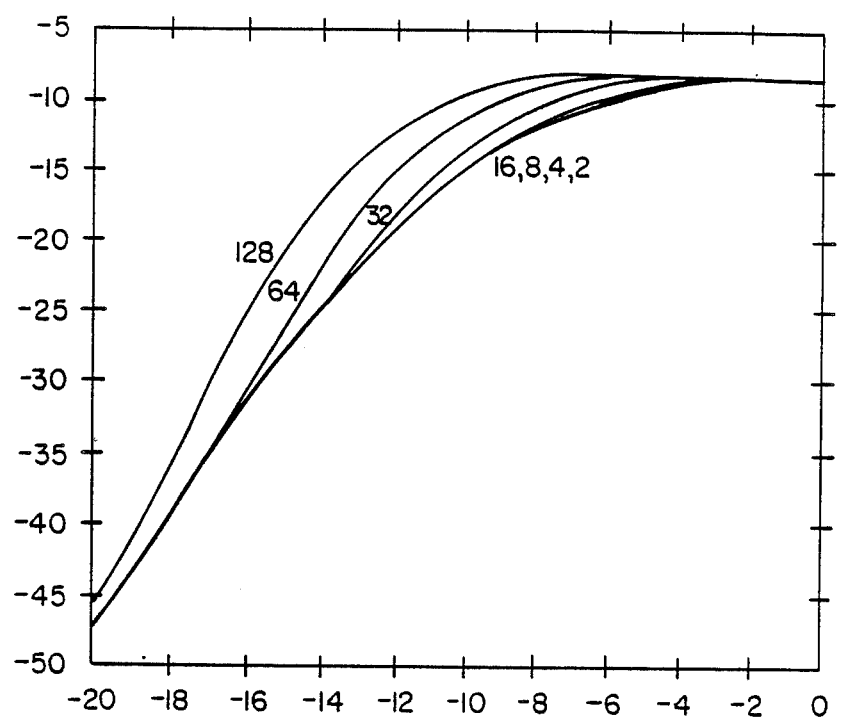
FIG. 5 is a graph indicating the relation of signal-noise ratio output ($SNR_o$) to signal-noise ratio input ($SNR_i$) for different values of L (number of channels)
Figure 6:
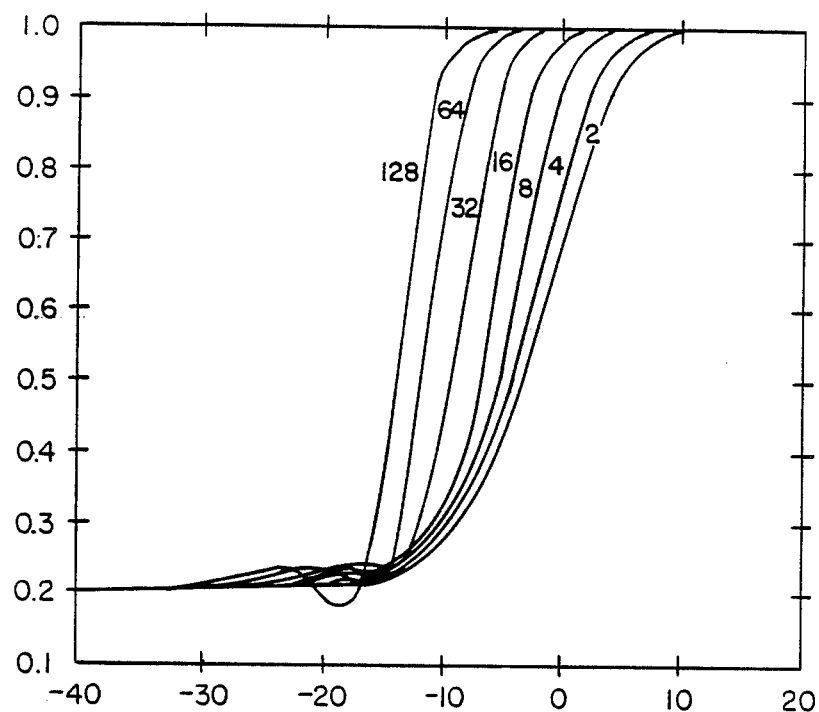
FIG. 6 is a graph indicating the relation of $q_{opt}$ (detection probability, optimum) to the signal-noise ratio input ($SNR_i$) for various values of L (number of channels)
Figure 9:
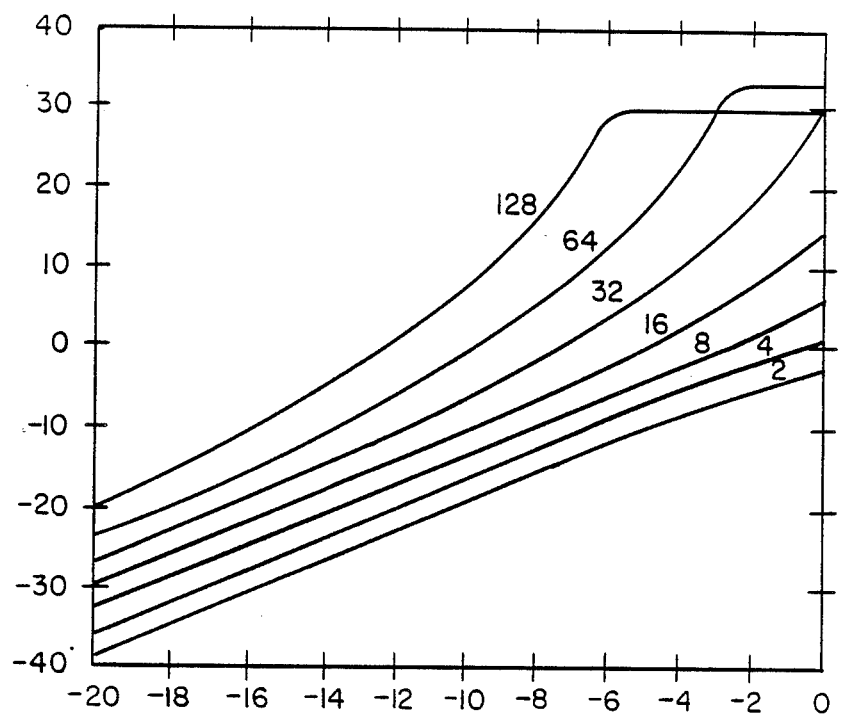
FIG. 9 shows the relation of first stage signal-noise ratio to the input signal-noise ratio.

Using these optimal values, first stage signal-to-noise ratio, $SNF_f$, is shown related to $SNR_i$ in FIG. 9 for various values of L. Then finally, the basic relationship between signal-to-noise ratios of output ($SNR_o$) and input ($SNR_i$) is shown in FIG. 5 for various values of L.

Figure 2A:
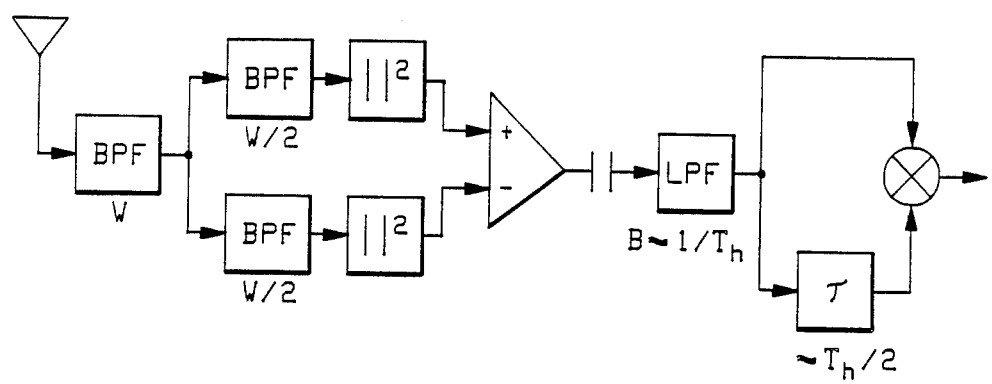
FIG. 2A is a diagram of the AC hop rate detector.
Figure 2B:
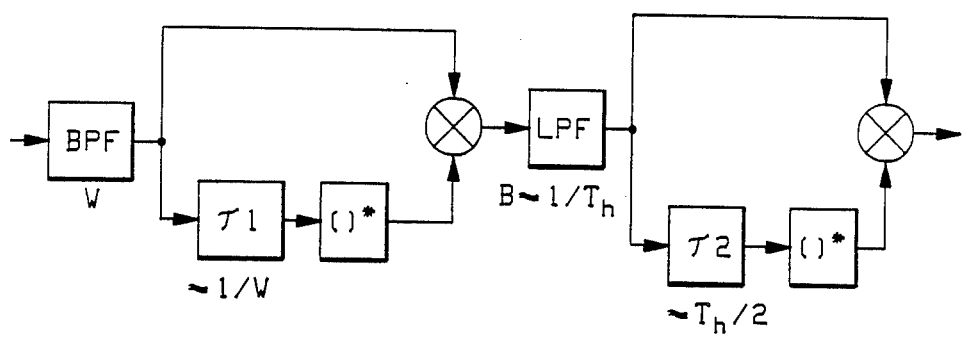
FIG. 2B is a diagram of the MODAC hop rate detector.
Figure 3A:
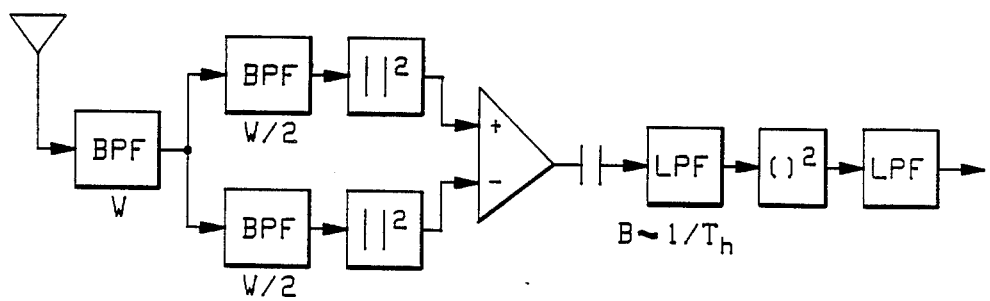
FIG. 3A is a drawing of an AC radiometer in block diagram form.
Figure 3B:
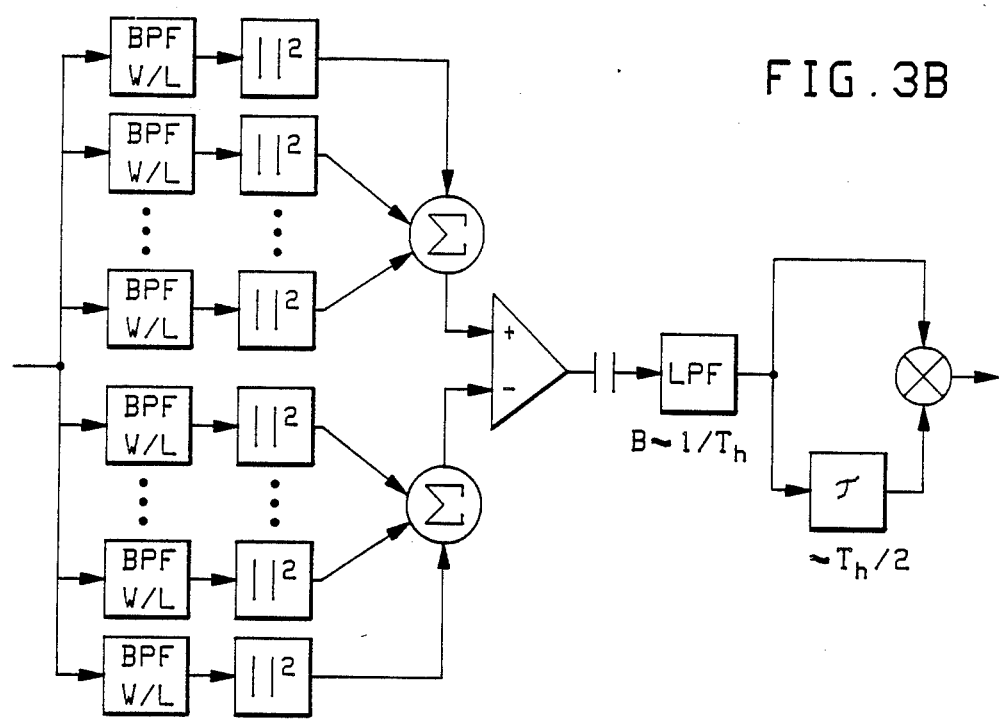
FIG. 3B is a block diagram of a hop rate detector.
Figure 4:
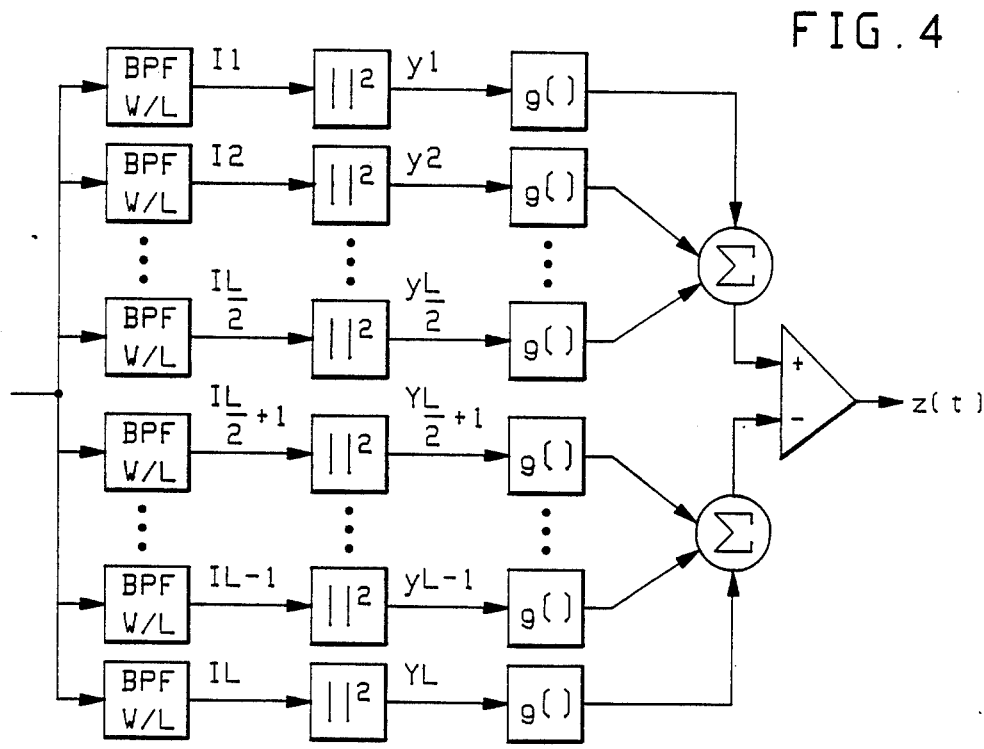
FIG. 4 is a block diagram of the first stage of a generalized detector system.

In the AC hop rate detector (FIG. 2A), the DC noise terms generated in the individual channels are cancelled in the difference amplifier. In addition, simulations indicate that the quantizers 15 (FIG. 1), while changing the amplitude of the noise distribution, do not change its relative spectral density significantly. Finally, the hop rate is assumed to be much smaller than the "chip rate" of the FH/DS input signal from which the lowpass filter cut off is B<W/L, FIG. 1. It follows that the noise power of the output of the lowpass filter 20 is reduced from the noise power of the output of the differential amplifier 18 by the factor B·L/W.

Thus, the signal-to-noise ratio at the lowpass filter output 21 (FIG. 1) is given by:

$$SNR_{LPF} = \frac{W}{2BL} \cdot SNR_f \quad \text{[Eq. V]}$$

where

W = a constant used to represent the entire spectral band of frequencies which are present at the input of the detector;
and B = a constant to represent the hop rate frequency such that $B = 1/t_h$.

$SNR_f$, the first stage signal-to-noise ratio was determined as a function of the input signal-to-noise ratio, $SNR_i$. Then by mathematical and charting operations, the signal-to-noise ratio ($SNR_f$) at the output of the first stage could be plotted as a function of the input signal-to-noise ratio ($SNR_i$) for different numbers of channels, "L".

However, the quantity of basic interest was the signal-to-noise ratio at the output of the delay and multiply stage 22 of FIG. 1. The delay-multiply stage 22 takes a signal waveform and "multiplies" it by a "delayed copy" of itself. Thus, to obtain the output signal-to-noise ratio $SNR_o$ as a function of the input signal-to-noise ratio, $SNR_i$, use was made of the "square corners" approximation while ignoring the effect of lowpass filtering of the signal. The square corners approximation considers that all of the signal power of a Direct Sequence (DS) signal is present (and has square corners).

Thus it was possible to obtain the output signal-to-noise ratio, $SNR_o$ as a function of $SNR_i$ for various values of L and this relationship is shown in the graph of FIG. 5. The optimal probability of false alarm can be shown to depend on the current "threshold setting" according to the developed formula:

$$p_{opt} = e^{-\frac{L_{th}}{2\sigma L}} \quad \text{[Eq. VI]}$$

where $p_{opt}$ = the optimal probability of false alarm.
$\sigma_l$ = variance of bandpass Gaussian noise present in channel $L_{th}$ = threshold voltage value determined for a channel.

Given L and an initial estimate of the input signal-to-noise ratio, a reasonable estimate for $p_{opt}$ can be obtained. From this, an estimate of the threshold value can be obtained.

This relationship is shown in the graphing of FIG. 7 which indicates the relationship of various values of L. The most reasonable estimate for $p_{opt}$ is seen to be the value of 0.20.

As was indicated previously, the threshold detector limits the power of any one channel, and thus, even if high power narrowband interference is present in a particular channel, its effect on the overall output signal-to-noise ratio will be quite limited.

It may be understood that if the narrowband interference power in a particular channel is high enough, then the corresponding threshold detector will be "turned on" almost continually. But then, the output of that particular channel will consist of a strong DC component with weak noise component, and since the first stage output is AC coupled to the second stage of the detector, then only a weak noise signal will be generated due to the presence of the narrowband interference signal which tends to diminish the information transmitted.

Actually, the maximum amount of noise will be generated when the narrowband interference power produces a nearly 50% probability of crossing the preset threshold, $L_{th}$.

As an example, suppose that L=128, and that worst case narrowband interference is simultaneously present in 20% of the channels. Further, suppose that the detector is searching for FH signals with only −20 dB signal-to-wideband-noise ratio in the input bandwidth, W. For this range, the optimal probability of false alarm is set to $p_{opt} \approx 0.01$. Then the noise power, for this worst case example, is increased by a factor of 5.37 over the case in which no narrowband interference is present. In addition, because 20% of the channels are jammed, the signal power is reduced by a factor of 0.8, from which it follows that the signal-to-noise ratio, $SNR_f$, is reduced by a factor of 0.15, which is equivalent to 8.3 dB.

By comparison, for the AC hop rate detector previously described, a single narrowband interference signal, with power 10 dB above the noise power, would reduce the first stage signal-to-noise rate shown ($SNR_f$) by 10 decibels.

Referring to the preferred embodiment shown in FIG. 1, the output of the upper group of threshold detectors 16 is fed into the summation circuit $16_{h1}$ while the outputs of the lower band of threshold detectors are fed into the second summation circuit $16_{h2}$.

The differential amplifier 18 then operates to "add" the output of the summation circuit $16_{h1}$ while "subtracting" output of the lower summation circuit $16_{h2}$.

Then the capacitor $18_c$ is used for AC coupling to the lowpass filter 20 which then provides an output 21 designated $SNR_{LPF}$ to a "delay and multiply circuit" 22.

The delay and multiply circuit 22 involves a delay circuit 24 (of approximately time delay $T_h/2$) which feeds a first signal input to the multiplier 26. The second input to the multiplier 26 comes from signal 21, to provide the final output of signal-to-noise ratio $SNR_o$ designated as output line 30.

Figure 10:
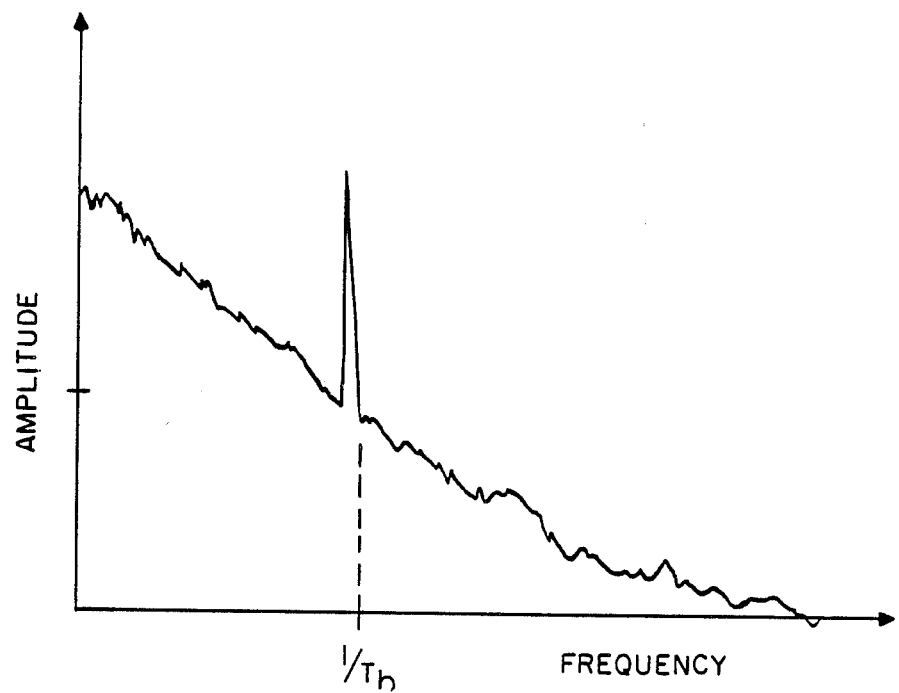
FIG. 10 is a graph of the final output signal where a spectral line indicates the frequency of the incoming frequency-hopped (FH) signal.

The signal present at line 30 is a time domain signal which contains noise only components when no FH signal is present at the input of the detector. But when an FH signal is present, the signal at line 30 will contain an additive sinusoidal component with frequency equal to that of the hop rate of the FH signal. The power spectrum of this signal will, therefore, contain a spectral line at the hop rate as illustrated in FIG. 10.

The spectral line is a line which indicates a particular frequency in the frequency spectrum which denotes the presence of an additive sinusoidal component in the signal with the corresponding spectrum.

GLOSSARY OF TERMS $A^2$ = power (value) of the FH signal (frequency hop signal).

B = a constant. In this case used to represent the hop rate frequency. Therefore, $B = 1/T_h$.

BF = Band Pass Filter.

BPSK = Binary Phase Shift Keying. Here the phase of the carrier is shifted 180° for each level change in the NRZ (non-return to zero) bit stream.

bipolar signal = a binary data signal whose bits are represented by ±V volts.

channelizer = a system which operates on a signal in order to divide the signal into multiple signals according to the spectral content.

chip rate = the rate at which data chips are transmitted. In spread spectrum, each data bit is transmitted "n" times, each time in different coded form. Each one of the n coded bits is called a "chip".

DS = Direct Sequence, which is a form of communication in spread spectrum systems where each terminal is assigned a particular code sequence. Here a digital pulse information bit is encoded a number of times (each time in different form) and only then is the result transmitted.

DS modulation = amplitude modulation of a carrier using a DS signal.

$E[g(y_i)]$ = Expected value of [ ] mathematical operator)

$E[n^2(t)]$ = N = output noise power.

FH = Frequency Hopping = transmission of signals which vary (hop) in frequency of the carrier false alarm = term denoting the crossing of the threshold $L_{th}$ when no signal is present in the channel.

Fourth Law detectors = detectors whose output signal to noise ratio ($SNR_o$) is related to the input signal to noise ratio ($SNR_i$) to the 4th power. That is: $SNR_o = K(SNR_i)^4$ with K being a constant.

g = generalized non-linearity representation.

$g_2$ or g( ) = first approximation to the optimal nonlinearity.

$H_0$ = signal absent (hypothesis)

$H_1$ = signal present (hypothesis)

hybrid detector = a detector which detects or paramaterizes hybrid FH signals. Hybrid FH signals are FH signals which also use DS signaling.

L = number of channels (one portion of bandwidth in a "channel" of communication. Total Bandwidth = W)

$L_{th}$ (threshold level) = a constant denoting a voltage level used for comparison; the threshold level that depends on the input signal-noise ratio.

LO = Local Oscillator

LPF = Low Pass Filter

N = noise power output $N_1$ = input noise power in single channel.

n(t) = noise component, which is a complex Gaussian noise waveform.

p = probability of false alarm.

$p_{opt}$ = optimal probability of signal detection.

PSK signal = Phase Shift Keying q = detection probability - that is, probability that threshold $L_{th}$ will be crossed when signal is present in the channel.

$q_{opt}$ = optimal probability of signal detection quantizer = a system which performs quantizing.

quantizing = a system of measuring magnitude of a varying quantity and providing a proportional output in pulse-code or digital form.

$R(\tau)$ = autocorrelation function.

$[r_1]$ = set of independent random variables.

radiometer = a system which performs power measurements.

$S_0$ = output signal power.

$S_1$ = input signal power.

$SNR_f$ = signal noise ratio (first stage).

$SNR_i$ = input SNR.

$SNR_o$ = output SNR (signal-noise ratio).

spectral density = the Fourier Transform power Spectral Density spectral line = a line in the frequency spectrum which denotes the presence of an additive sinusoidal component in the signal with the corresponding spectrum.

square corners approximation = the approximation that all the signal power of a DS signal is present (i.e., it has square corners).

$T_1$ or $\gamma_1$ = constants representing lengths of time $Tau_2$ or $\gamma_2$ = a constant used to represent a given length of time $T_h$ = hop dwell time period (time between frequency shifts)

$T_h/2$ = ½ of hop dwell time.

W = a constant. In this case used to represent the entire spectral band of frequencies which are present at the input of the detector.

$x_i$ = complex output of ith filter.

z(t) = the signal at the output of differential amplifier.

$|\ |^2$ or $()^2$ = squaring operation of whatever signal is at the input of the operator.

$\epsilon$ = constant denoting small increment.

$\mu_0$ = the mean of the channel when signal is absent.

$\mu_1$ = the mean of the channel when signal is present.

$\Sigma$ = summation sign $\alpha$ = constant denoting a small increment.

$\sigma_L^2$ = the variance of the bandpass Gaussian noise present in each channel.

$\delta$ = partial differential operator u(y) = unit step function

Described herein has been a hybrid type frequency hop detector for sensing presence of, and hop rate changes of, transmitted information signals permitting the diminishment of interference-type of jamming signals (noise), which enables a notable increase of the informative signal-to-noise ratio to enhance detection of signal information.

While other systems may have similar features and functions, it should be understood that the described channelized binary-level hop rate detector is encompassed by the following claims.

What is claimed is:

1. A system for enhancing the signal-noise ratio of frequency-hopped information conveying signals comprising in combination:

(a) means for channelizing said frequency-hopped signals into a plurality (L) of sub-bands to form an upper group ($B_u$) of sub-bands and a lower group ($B_d$) of sub-bands;

(b) means for estimating the signal power of each channel and transmitting each power estimate to an individual quantizer means;

(c) said quantizer means providing a separate threshold comparator for each channel and functioning to quantize each power level into binary level form;

(d) means for subtracting the totalized sum of said lower group of channel signals from the totalized sum of said upper channel signals to generate a combination noise and direct sequence signal with transitions at the hop rate; and (e) means for generating an output signal tone at the hop rate.

2. The combination of claim 1 wherein said means for channelizing includes:

(2a) a plurality of band pass filters wherein each said band pass filter is allocated reception capability for a sub-band portion of the overall bandwidth (W).

3. The combination of claim 2 wherein said upper group ($B_u$) of sub-bands permits signal/noise reception of the upper half of frequencies in the bandwidth (W) and said lower group of sub-bands permits signal/noise reception of the lower half of frequencies in the bandwidth (W).

4. The combination of claim 1 where said means for estimating the signal power includes:

(4b1) a plurality of squaring circuit means where each sub-band channel signal/noise is multiplied by itself to estimate its power value.

5. The combination of claim 1 wherein said quantizer means includes:

(5c1) a plurality of quantizer circuits providing a quantizer circuit unit for each channel wherein each quantizer unit functions to convert the power level into a binary level, each said quantizer circuit unit including:

(5c1 a) a preset voltage threshold value ($L_{th}$) which only permits generation of a positive voltage when the channel signal power is greater than the threshold voltage.

6. The combination of claim 5 wherein said means for subtracting the totalized sum includes:

(6d1) a first summation circuit unit for receiving and totalizing the output signals of each one of said quantizer units operating in the upper sub-bands ($B_u$);

(6d2) a second summation circuit unit for receiving and totalizing the output signals of each one of said quantizer units operating in the lower sub-bands ($B_d$);

(6d3) differential amplifier means for subtracting the output of said second summation circuit unit from the output of said first summation circuit unit to generate a first stage noise and direct sequence output.

7. The combination of claim 6 wherein said means for generating an output signal tone at the frequency hop rate includes:

(7a1) means for diminishing the noise components and enhancing the direct sequence signal components.

8. The combination of claim 7 wherein said means for diminishing and enhancing includes:

(8ea) capacitive coupling means to eliminate DC components in the signal/noise outputs;

(8eb) low pass filter means for eliminating high frequency components;

(8ec) delay-multiply circuitry means for generating an output signal tone at the frequency hop rate of the original signal transmitted.

9. The system of claim 1 wherein said means (e) for generating a hop rate signal tone includes:
- (e1) capacitor means for eliminating DC signal components;
- (e2) low pass filter means having a bandwidth which is $1/T_h$, where $T_h$ = the hop-dwell time period;
- (e3) delay and mix circuit means for multiplying the output signal of said low pass filter means by a time delayed copy of itself, said time delay being set to one-half of the hop-dwell period.

10. Apparatus for receiving a frequency-hopped signal comprising in combination:
- (a) means for receiving a broad band of frequency signals which encompass a frequency-hopped information signal sequence;
- (b) dividing means for channeling said frequency signals into a plurality of sub-bands wherein each sub-band carries a portion of said information signal sequence, said dividing means being split into an upper group and lower group of sub-bands;
- (c) a plurality of signal squaring circuits wherein each signal squaring circuit multiplies its portion of said information signal sequence by its own amplitude and transmits it to an associated quantizer circuit unit;
- (d) a plurality of quantizer circuit units where each quantizer circuit unit receives the particular power level estimate from its associated squaring circuit and matches it against a preset threshold level, whereupon, if the input signal exceeds the threshold level, the quantizer unit develops a positive voltage output, but a zero volt output if the threshold is not exceeded;
- (e) an upper summation circuit unit for adding up the outputs of each one of said upper group of quantizer circuit units to provide a first totality;
- (f) a lower summation circuit unit for adding up the outputs of each one of said lower group of quantizer circuit units to provide a second totality;
- (g) differential amplifier means for subtracting said second totality from said first totality and providing a difference signal to a low pass filter means; and
- (h) delay and multiply circuit means for receiving the output of said low pass filter means, and generating a final output signal representative of the frequency hop rate of the transmitted information signal.

11. A method for detecting the presence of, and estimating the hop rate of frequency-hopped information conveying signals comprising the steps of:
- (a) receiving a wide band of frequencies covering a transmitted frequency-hopped sequence of signals;
- (b) segregating (channelizing) said wide band into a plurality of sub-bands, said sub-bands divided into an upper group and lower group;
- (c) squaring the output signals of each of said sub-bands;
- (d) quantizing the power estimates of each sub-band to provide a binary level representation for each channel;
- (e) totalizing the sum (upper sum) of the binary level representations for said upper group;
- (f) totalizing the sum (lower sum) of the binary level representations for said lower group;
- (g) subtracting said lower sum from said upper sum;
- (h) generating a tone at the hop rate of the frequency shifting information conveying signal.

12. The method of claim 11 wherein step (h) includes the steps of:
- (h1) eliminating any DC signal components;
- (h2) filtering the remaining AC signal through a low pass filter;
- (h3) multiplying the remaining AC signal with a delayed copy of itself.

* * * * *